3,639,605
WAX-COATED AND MICRONIZED ACETOXY-METHYL BENZYLPENICILLINATE

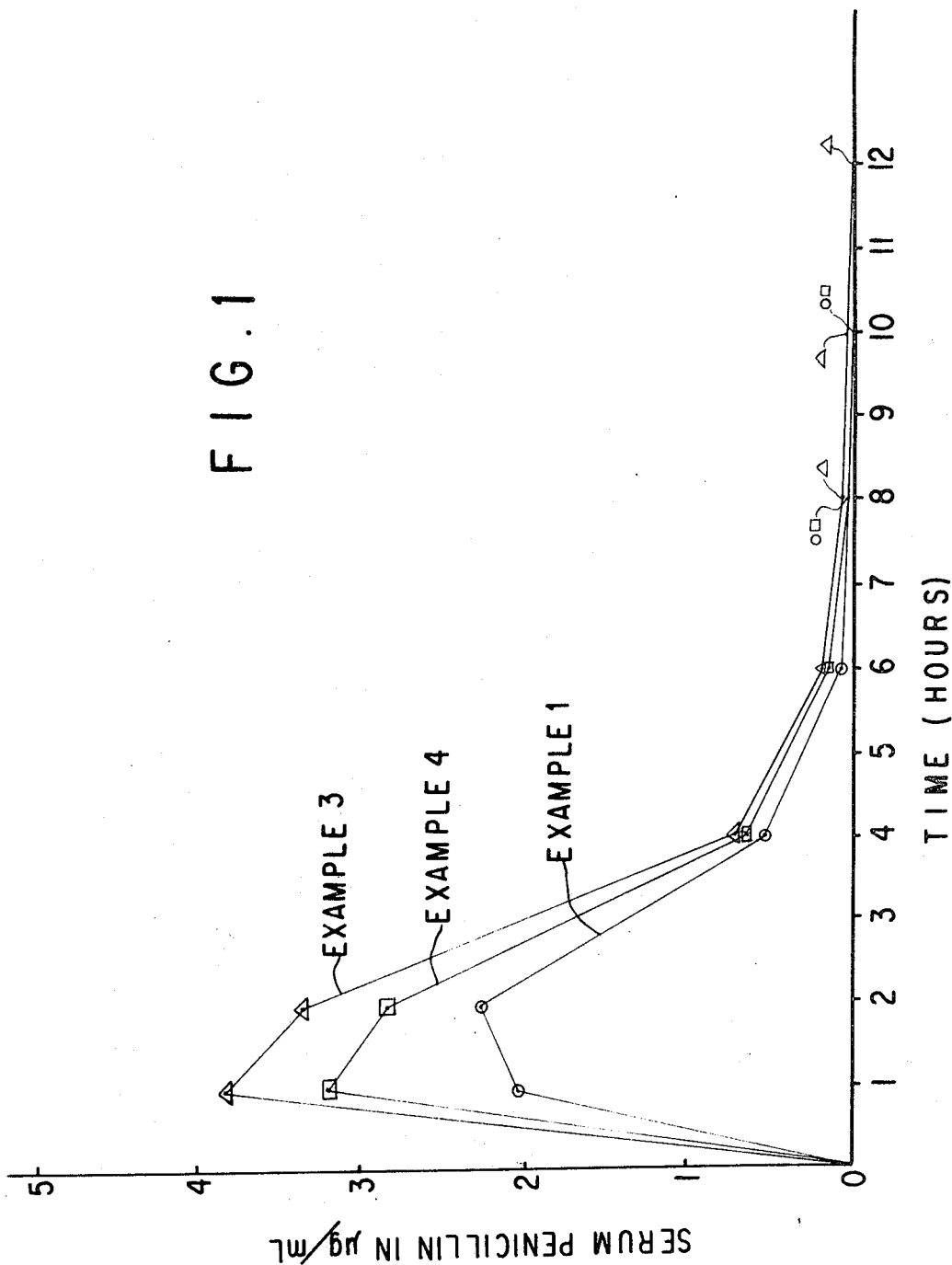

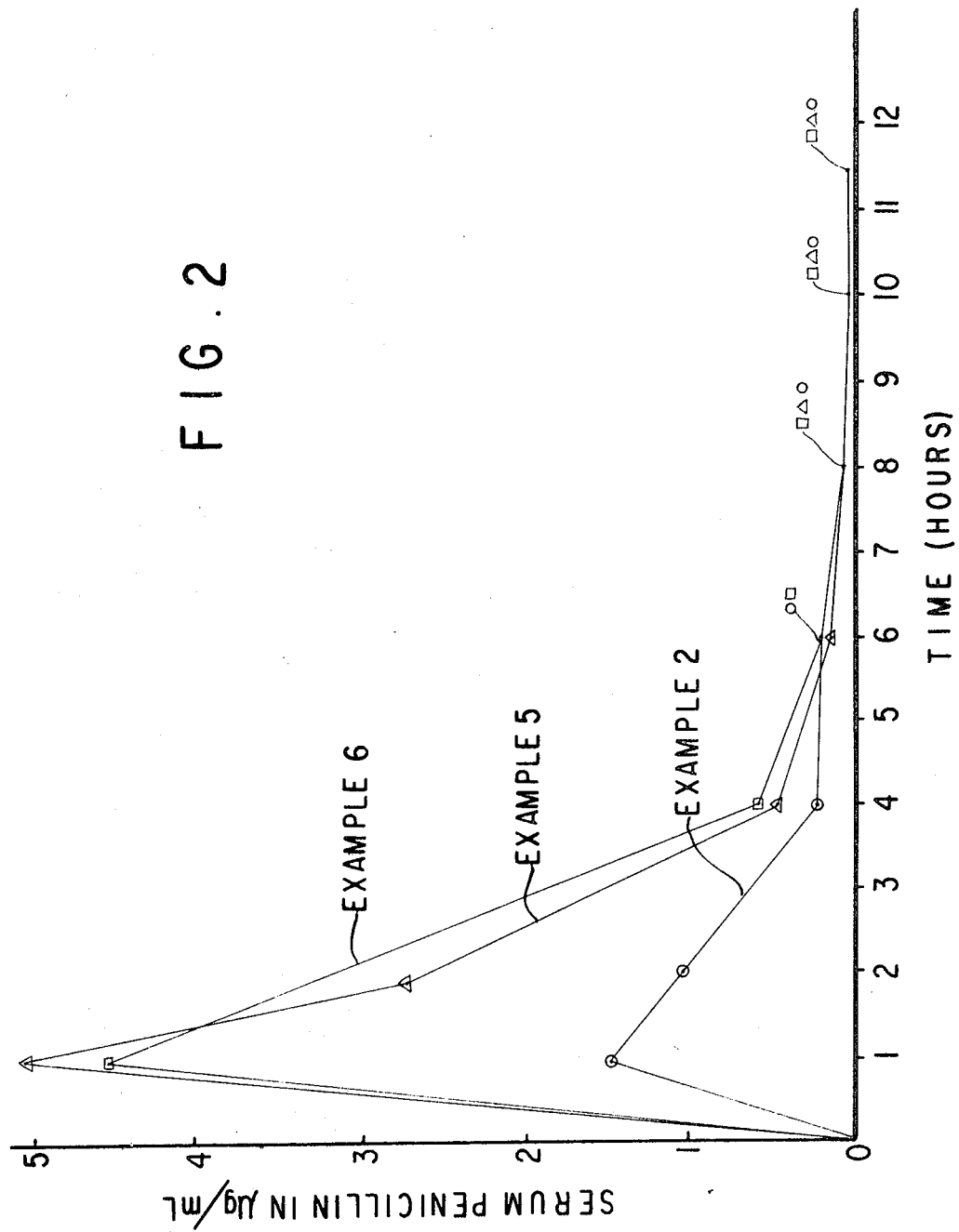

Arthur W. T. Rule, Westbourne, West Sussex, Roy E. Shimmin, Belmont Park, Maidenhead, and Timothy Laundy, Wargrave, Reading, England, assignors to John Wyeth & Brother Limited, Taplow, England
Filed July 23, 1968, Ser. No. 746,849
Claims priority, application Great Britain, Aug. 8, 1967, 36,336/67
Int. Cl. A61k 27/00
U.S. Cl. 424—271                                                8 Claims

ABSTRACT OF THE DISCLOSURE

Acetoxymethyl benzylpenicillinate of improved properties in respect to ease of handling and blood levels attainable is prepared by micronizing the known (bulk) product; preferably the micronized product is also admixed or coated with a compatible and pharmaceutically acceptable wax. The novel product may be administered as an aqueous suspension or as a solid in capsules or tablets. Desirably higher blood levels of penicillin result from its administration than are achieved by use of the prior art unmicronized acetoxymethyl benzylpenicillinate.

---

This invention relates to a new form of a known penicillin, a penicillin composition and a method for the preparation thereof.

U.S.A. Patent No. 3,250,679 describes and claims acetoxymethyl benzylpencillinate as well as pharmaceutical preparations in unit dosage form for oral use comprising acetoxymethyl benzylpenicillinate admixed with a pharmaceutical carrier. The patent also describes and claims a method for the preparation of acetoxymethyl benzylpenicillinate by reacting an acetoxymethyl halide (preferably the bromide) with a salt of benzylpenicillin selected from the group consisting of the alkali metal and amine salts thereof, in an inert solvent at a temperature within the range of from 0° to 30° C.

The known (bulk) acetoxymethyl benzylpenicillinate obtained by this process suffers from the disadvantages that it is difficult to handle as the particles have very cohesive and adhesive properties and so tend to form agglomerates which are difficult to separate by chemical or mechanical means. It is thus rather difficult to prepare a suspension. Furthermore, the known crystalline acetoxymethyl benzylpenicillinate has a low bulk density so that it is difficult to fill capsules of reasonable size with the active material without compacting it, as suitable unit doses usually contain 350 to 360 mg. of active material.

We have now found that acetoxymethyl benzylpenicillinate can be provided in an improved form. Accordingly, the present invention provides acetoxymethyl benzylpenicillinate in finely divided form, i.e. as particles with a size of generally less that 40μ. The invention also provides, as a preferred embodiment, a new pharmaceutical composition comprising acetoxymethyl benzylpenicillinate in finely divided form and admixed and/or coated with a pharmaceutically acceptable compatible wax which is substantially non-toxic. Once the active material has been provided in finely divided form (e.g. by micronising) and optionally admixed and/or coated with the wax, it can be made into a suspension with a suspending agent, tabletted or capsules filled with it in the usual manner.

The micronised, and the micronised wax-coated and/or wax-admixed, acetoxymethyl benzylpenicillinate provided by the invention gives better penicillin blood levels than the known bulk acetoxymethyl benzylpenicillinate. In addition, the wax coated and/or admixed micronised material provided by the preferred embodiment of the invention aids handling, is more easily suspendable, is wetted more easily and has an increased bulk density (about 50 to 60% higher) compared with the known bulk material. This means that it is possible to pack a whole unit dose of the wax-coated and/or admixed micronised penicillin into a capsule without having to compress the material unduly and, as the flow characteristics are improved, the capsules are easier to fill. A very important advantage of the wax-coated and/or admixed micronised material is that it is possible to mask the relatively unpleasant taste of the acetoxymethyl benzylpenicillinate, especially in suspensions. This property is of particular importance when suspensions are made up for administering to children, as the taste clearly should be as pleasant as possible.

The invention also provides a method of preparing the new form of acetoxymethyl benzylpenicillinate which comprises micronising the acetoxymethyl benzylpenicillinate. This micronised material may then be mixed with a liquid form of the non-toxic wax, the mixture solidified and, simultaneously with or after solidifying, the mixture can be formed into particles. Alternatively, the micronised material may be used as it is, e.g. for filling capsules or making suspension.

In a preferred method, acetoxymethyl benzylpenicillinate is first micronised so that the particles are less than 10μ in size (with the majority being preferably less than 5μ and advantageously up to 2μ. A melt is made separately of the non-toxic wax and other desired ingredients, e.g. a waxy emulsifier miscible therewith, and this melt and the micronised penicillin are intimately mixed together at a temperature above the solidification point of the melt but below the melting point of the penicillin (104–108° C.). We have found that temperatures of 65 to 90° C., preferably about 80° C. (e.g. 75–85° C.) are suitable. A Z-blade mixer is very suitable for carrying out this step. Once the intimate mixture has been obtained the mixture is cooled, e.g. chilled using Dry Ice, and milled to give the desired particles of size below 60 mesh and preferably below 100 mesh. We have found it possible to obtain a material, at least 95% by weight of which is of size below 100 mesh. The milling advantageously is carried out with a mechanical hammer mill. The particles obtained may, if desired, then be filled into capsules. From 40 to 95 (preferably 60 to 75) percent by weight of the penicillin and 60 to 5 (preferably 40 to 25) percent by weight of wax generally is used in this embodiment.

The mesh size quoted in this specification is to A.S.T.M. (i.e. American Society for Testing of Materials) standard. The micron sizes of various of such mesh are as follows:

| A.S.T.M. mesh: | Micron size of mesh holes |
|---|---|
| 40 | 420 |
| 60 | 250 |
| 80 | 177 |
| 100 | 149 |

In an alternative preferred method to that described above, the acetoxymethyl benzylpenicillinate is again micronised and intimately mixed with the molten wax at a temperature of 65 to 90° C. (preferably at about 85° C.). The mixture is then solidified and formed into particles in one step by spray-congealing through an atomiser. For example, the mixture can be passed downwardly through a heated pipe on to a revolving atomising wheel while passing air upwardly. Warm air at temperatures up to 60° C. has been found to be preferred, as the particles have a temperature of 35 to 45° C. after atomisation (there being heat loss in the atomising apparatus). The spray-coated particles obtained by this embodiment generally have a size of up to 140μ, with the majority being up to 60μ, preferably about 30μ. This embodiment provides particles which are very suitable for making suspensions as they can easily be mixed with other ingredients such as wetting agents, flavouring agents and stabilising agents. Generally from 1 to 30 (preferably 10 to 20) percent by weight of the penicillin and 99 to 70 (preferably 90 to 80) percent by weight of wax is used in this embodiment.

In a third embodiment, the acetoxymethyl benzylpenicillinate is micronised and suspended in a solution of the non-toxic wax. After removing the solvent, e.g. by heating or spray drying, the mixture can be milled to give the desired particles.

Although the action of the wax is not definitely known, we believe that it may separate the particles of the micronised penicillin when admixed therewith and keep them separated even after milling or atomising. The wax should be a material which does not react with the penicillin, and which has a melting point below that of the penicillin but above room temperature. Waxes with melting points in the range 40–90° C., preferably 50 to 75° C., are very suitable. A preferred wax is a long chain ($C_{16}$–$C_{20}$) aliphatic acid such as stearic acid (M.P. 54° C.) but other examples are paraffin waxes. petrolatum, mineral waxes (e.g. ozokerite, Ceresin, utal and Montan wax), vegetable waxes (e.g. carnauba, Japan, Bayberry, or flax wax), animal waxes (e.g. spermaceti) and insect waxes (e.g. bees wax, Chinese wax or shellac).

It is also possible to use synthetic waxes, e.g. silicone waxes, or a mixture of hydrogenated castor oil and ethyl cellulose.

Other ingredients can be mixed with the wax, the micronised penicillin or with the final product, as desired. For example, a dispersing agent (e.g. sodium lauryl sulphate) can be added; or, when preparing a product suitable for filling into capsules a waxy emulsifier can be incorporated in the melt. Such an emulsifier should be of a waxy nature in order to be miscible with the wax, and should have good melting properties. We have found a polyoxyethylene stearate of melting point 40–60° C. known commercially as "Polyoxol (40) Stearate" (i.e. Mirj 52) to be very suitable. Furthermore, compounds to improve the flow characteristics (e.g. a commercial form of silicon dioxide such as Aerosil) can be added.

In the following examples, the parts are by weight. Examples 1 and 2 relate to the preparation of compositions of the known form of acetoxymethyl benzylpenicillinate. The remaining non-limiting examples illustrate the invention.

EXAMPLE 1 (FOR COMPARISON PURPOSES)

The following constituents were used:

|  | Parts |
|---|---|
| Acetoxymethyl benzylpenicillinate (40/50 mesh) | 350 |
| Maize starch dried, 40 mesh | 55.4 |
| Solka Floc Bw 200, 40 mesh | 42.0 |
| Magnesium stearate, 40 mesh | 5.6 |
|  | 453.0 |

The penicillin was mixed with the starch, the Solka Floc and 4.2 parts of the magnesium stearate. The mixture was slugged and granulated through a No. 16 mesh sieve. These granules were mixed with the rest of the magnesium stearate and tabletted using ⅜ inch normal concave punches.

EXAMPLE 2 (FOR COMPARISON PURPOSES)

Twelve suspensions were prepared as described in this example for use in the testing given in Example 7. The weight of the penicillin used varied depending on the weight of the dog to be treated therewith.

Acetoxymethyl benzylpenicillin—various weights from 191.3 to 302.5 mg.
Sodium lauryl sulphate—1 mg.
Distilled water—10 ml.

The penicillin and sodium lauryl sulphate were mixed together in a 10 ml. syringe. The water was added with shaking just prior to dosing the dogs and the mixture shaken together to give a suspension.

EXAMPLE 3

In order to prepare a material in accordance with the invention suitable for filling capsules, the following constituents were used:

|  | Parts |
|---|---|
| Micronised acetoxymethyl benzylpenicillin | 25 |
| Stearic acid B.P. | 12.5 |
| Polyoxol (40) stearate | 0.75 |

The penicillin was micronised in a Berk 2-inch microniser. The particles obtained were of a size less than $40\mu$, 80% of them being less than $7\mu$ and 60% less than $5\mu$. When micronisation was repeated on another sample using an 8 inch Cox Fluid Energy Mill, substantially all of the particles were of a size less than $10\mu$, 95% of them being less than $7\mu$ and 82.5% being less than $5\mu$. The stearic acid was melted on a hot plate and the micronised penicillin was folded in, using a spatula, until a completely homogeneous smooth mass was obtained. The mass was removed and chilled with Dry Ice. When completely hard the mass was milled by passing twice through a Raymond hammer mill. It was then passed through a 100 mesh sieve.

0 and 00 capsules were packed with the micronised coated material prepared as described above. The capsules used depended on the weight of the dog to be treated with them (see Example 7).

EXAMPLE 4

The procedure of Example 3 was followed but, after being poured twice through the hammer mill, the milled mass was mixed with 0.75 part of Aerosil. The mixture obtained was then packed into capsules.

EXAMPLE 5

Acetoxymethyl benzylpenicillinate was micronised in a Berk 2-inch microniser. The material obtained was then used to make up a suspension following the procedure of Example 2. As with that example, the amount of material used in each case depended on the dog to be treated therewith. The following constituents were used to make the suspension:

Acetoxymethyl benzylpenicillinate (micronised)—various weights from 186.3 to 256.3 mg.
Sodium lauryl sulphate—5 mg.
Distilled water—10 ml.

EXAMPLE 6

The following constitutes were used:

|  | Parts |
|---|---|
| Micronised acetoxymethyl benzylpenicillinate | 20 |
| Stearic acid B.P. | 80 |

The penicillin was micronised in a Berk 2-inch microniser.

The stearic acid was heated to a temperature of about 85° C. and the penicillin added. The suspension was stirred rapidly until it was homogeneous and the temperature was maintained at 85° C.

The suspension was then spray cooled using a Niro minor spray dryer. The finely divided coated material obtained was made into a suspension by admixture with sodium lauryl sulphate and distilled water.

EXAMPLE 7

(a) The composition of Example 1 was administered orally to 12 dogs (beagles) using a dose of 25 mg. of acetoxymethyl benzylpenicillin per kg. of body weight of each dog. After the intervals of time given below, a sample of the dogs' blood was taken and the serum submitted to bioassay. The experiment was then repeated for each of the other examples. The results are given below and are the experimental results, and therefore are statistically uncorrected.

BLOOD SERUM LEVELS
[Average of 12 dogs (in μg./ml.)]

| Time (hours) | 1 | 2 | 4 | 6 | 8 | 10 | 12 |
|---|---|---|---|---|---|---|---|
| Product: | | | | | | | |
| Example 1 (comparison) | 2.04 | 2.28 | 0.52 | 0.07 | 0.03 | 0.008 | 0.003 |
| Example 3 | 3.81 | 3.36 | 0.71 | 0.18 | 0.07 | 0.03 | 0.01 |
| Example | 3.18 | 2.85 | 0.65 | 0.14 | 0.04 | 0.02 | 0.01 |
| Example 2 (comparison) | 1.5 | 1.07 | 0.23 | 0.18 | 0.07 | 0.03 | 0.02 |
| Example 5 | 5.02 | 2.68 | 0.44 | 0.15 | 0.06 | 0.03 | 0.01 |
| Example 6 | 4.59 | 3.22 | 0.54 | 0.07 | 0.01 | 0.002 | <0.01 |

Since the total amount of penicillin released is an important factor, the results have been set out as graphs in the accompanying drawings. In these drawings, FIG. 1 is a graph of serum penicillin in μg./ml. against time in hours for the known acetoxymethyl benzylpenicillinate tablets of Example 1 (circled points) and the product of the invention in the form of the capsule of Example 3 (points within triangles) and in the form of the capsules of Example 4 (points within squares);

FIG. 2 is a graph of penicillin in μg./ml. against time in hours for the known acetoxymethyl benzylpenicillinate suspension of Example 2 (circled points), the micronised product of the invention in the form of the suspension of Example 5 (points within triangles), and the coated micronised product of Example 6 in the form of a suspension (points within squares).

As can be seen, the area under the graphs for the products of Examples 3 and 4 is greater than that for the product of Example 1, and the area under the graphs for the products of Examples 5 and 6 is greater than that for the product of Example 2, thus showing that the products of the invention give a higher penicillin blood level.

(b) The results of the serum levels of the products of the invention were analysed statistically and compared with the results for the known products. Thus, the results for the product of Example 4 were compared with the results for the product of Example 1, and the results for the products of Examples 5 and 6 were compared with the results for the product of Example 2, and the $p$ values measured. The $p$ values obtained were

| Time (hours) | 1 | 2 | 4 | 6 | 8 | 10 | 12 |
|---|---|---|---|---|---|---|---|
| Ex. 3 against Ex. 1 | 0.01-0.001 | 0.05-0.02 | >0.1 | >0.1 | >0.1 | >0.1 | >0.1 |
| Ex. 5 against Ex. 2 | <0.001 | 0.02-0.01 | >0.1 | >0.1 | >0.1 | >0.1 | >0.1 |
| Ex. 6 against Ex. 2 | <0.001 | <0.001 | 0.05-0.02 | >0.1 | >0.1 | >0.1 | >0.1 |

(c) A further suspension was made up by spray coating micronised acetoxymethylbenzyl penicillin with a mixture of castor wax and stearic acid (3:1 ratio) using a coating:penicillin ratio of 4:1, i.e. the following amounts were used:

| | Grams |
|---|---|
| Acetoxymethylbenzylpenicillinate | 34 |
| Stearic acid | 34 |
| Castor wax | 102 |

The serum penicillin levels after administration at 25 mg./kg. to dogs were measured and compared statistically with the suspension of Example 2. The results were:

| Time (hours) | 1 | 2 | 4 | 6 | 8 | 10 | 12 |
|---|---|---|---|---|---|---|---|
| Serum penicillin (μg./ml.) | 2.12 | 2.13 | 0.73 | 0.34 | 0.13 | 0.05 | 0.03 |
| $p$ Value | 0.1-0.05 | 0.01-0.001 | 0.01-0.001 | >0.1 | >0.1 | >0.1 | >0.1 |

It is seen that the products of the invention unexpectedly give a statistically significant improvement when compared with the known unmicronised material.

What is claimed is:

1. Comminuted crystalline acetoxymethyl benzylpenicillinate having a crystal particle size less than 40μ, coated with a pharmaceutically acceptable wax, and having a coated particle size such that the particles pass an A.S.T.M. 100 mesh sieve.

2. A product according to claim 1 in which the wax is selected from the group consisting of aliphatic acids containing from 16 to 20 carbon atoms, beeswax, hydrogenated castor oil and mixtures thereof.

3. A product according to claim 2 in which the wax is stearic acid.

4. A product according to claim 1 in which the crystal particle size is less than 10μ.

5. A product according to claim 2 in which the crystal particle size is less than 10μ.

6. A product according to claim 3 in which the crystal particle size is less than 10μ.

7. A process for preparing wax-coated micronized acetoxymethyl benzylpenicillinate wherein a melt of a wax is intimately mixed with comminuted crystalline acetoxymethyl benzylpenicillinate having a crystal particle size less than 40μ at a temperature above the melting point of the wax but below 104° C., and the melt is then cooled and milled to produce a product such that the particles pass an A.S.T.M. 100 mesh sieve.

8. A process as claimed in claim 7 wherein the mixing is effected at 75–85° C.

References Cited

UNITED STATES PATENTS

| 2,515,898 | 7/1950 | Rhodehamel | 424—271 |
| 2,544,272 | 3/1951 | Miller | 424—271 |
| 2,902,407 | 9/1959 | Gross et al. | 424—271 |
| 3,105,793 | 10/1963 | Lobel | 424—271 |
| 3,250,679 | 5/1966 | Jansen et al. | 424—271 |

ALBERT T. MEYERS, Primary Examiner

D. M. STEPHENS, Assistant Examiner